(12) United States Patent
Han et al.

(10) Patent No.: US 11,137,242 B2
(45) Date of Patent: Oct. 5, 2021

(54) CONDUCTIVE FIBER COMPRISING METAL NANOBELT AND CARBON NANOMATERIAL COMPOSITE, METHOD FOR PRODUCING CONDUCTIVE FIBER, FIBROUS STRAIN SENSOR, AND METHOD FOR PRODUCING FIBROUS STRAIN SENSOR

(71) Applicant: Korea Electrotechnology Research Institute, Changwon-si (KR)

(72) Inventors: Joong Tark Han, Changwon-si (KR); Geon Woong Lee, Changwon-si (KR); Seon Hee Seo, Changwon-si (KR); Jeong In Jang, Changwon-si (KR); Seung Yol Jeong, Gimhae-si (KR); Hee Jin Jeong, Changwon-si (KR)

(73) Assignee: Korea Electrotechnology Research Institute

( * ) Notice: Subject to any disclaimer, the term of this patent is extended or adjusted under 35 U.S.C. 154(b) by 42 days.

(21) Appl. No.: 16/202,399

(22) Filed: Nov. 28, 2018

(65) Prior Publication Data

US 2019/0094005 A1   Mar. 28, 2019

Related U.S. Application Data

(63) Continuation of application No. PCT/KR2017/005602, filed on May 30, 2017.

(30) Foreign Application Priority Data

Jun. 1, 2016   (KR) .......................... 10-2016-0068255

(51) Int. Cl.
| | |
|---|---|
| *G01B 7/00* | (2006.01) |
| *G01B 7/16* | (2006.01) |
| *D01F 1/09* | (2006.01) |
| *C01B 32/174* | (2017.01) |
| *D01F 8/18* | (2006.01) |
| *D01F 9/12* | (2006.01) |
| *C08K 3/04* | (2006.01) |
| *C01B 32/168* | (2017.01) |
| *C01B 32/194* | (2017.01) |

(Continued)

(52) U.S. Cl.
CPC .............. *G01B 7/18* (2013.01); *C01B 32/168* (2017.08); *C01B 32/174* (2017.08); *C01B 32/194* (2017.08); *C08J 3/212* (2013.01); *C08K 3/041* (2017.05); *C08K 3/08* (2013.01); *C08K 7/00* (2013.01); *D01F 1/09* (2013.01); *D01F 8/10* (2013.01); *D01F 8/16* (2013.01); *D01F 8/18* (2013.01); *D01F 9/12* (2013.01); *H01B 1/22* (2013.01); *H01B 1/24* (2013.01); *B82Y 15/00* (2013.01); *B82Y 30/00* (2013.01); *B82Y 40/00* (2013.01); *C01B 2202/06* (2013.01); *C01B 2202/22* (2013.01); *C01B 2204/22* (2013.01); *C08J 2329/04* (2013.01); *C08K 2003/0806* (2013.01); *C08K 2003/0843* (2013.01); *C08K 2201/001* (2013.01); *C08K 2201/011* (2013.01); *D10B 2101/20* (2013.01);

(Continued)

(58) Field of Classification Search
CPC .... G01B 7/18; H01B 1/22; H01B 1/24; D01F 1/09; D01F 8/18; D01F 9/12; D01F 8/10; D01F 8/16; C08J 2329/04; C08J 3/212; B82Y 30/00; B82Y 15/00; B82Y 40/00; C01B 2202/06; C01B 2202/22; C01B 2204/22; C01B 32/174; C01B 32/168; C01B 32/194; C08K 2003/0806; C08K 2003/0843; C08K 2201/001; C08K 2201/011; C08K 3/041; C08K 3/08; C08K 7/00; D10B 2101/20; D10B 2321/06; D10B 2331/10; D10B 2401/16
USPC ........... 427/125, 113, 118, 122, 58; 252/500
See application file for complete search history.

(56) References Cited

U.S. PATENT DOCUMENTS

| | | | | |
|---|---|---|---|---|
| 9,873,811 | B2 * | 1/2018 | Han | ........................ H05K 9/009 |
| 10,100,209 | B2 * | 10/2018 | Han | ........................ C09D 5/24 |

(Continued)

FOREIGN PATENT DOCUMENTS

| | | | | |
|---|---|---|---|---|
| KR | 101410854 B1 * | 6/2014 | ............ | C09D 11/52 |
| WO | WO-2014163236 A1 * | 10/2014 | ............... | C09D 5/24 |

(Continued)

OTHER PUBLICATIONS

International Search Report for PCT/KR2017/005602, 4 pages, dated Sep. 7, 2017. (Year: 2017).*

*Primary Examiner* — Douglas J Mc Ginty
(74) *Attorney, Agent, or Firm* — Park & Associates IP Law, P.C.

(57) ABSTRACT

A conductive fiber including a metal-nanobelt-carbon-nanomaterial composite. A manufacturing method thereof includes preparing a composite including a carbon nanomaterial and metal nanobelts and manufacturing a conductive fiber by mixing the composite with a polymer. A fibrous strain sensor and a manufacturing method thereof are also provided. Thereby, a conductive fiber including a metal-nanobelt-carbon-nanomaterial composite, which is able to increase conductivity of the conductive fiber through synthesis of metal nanobelts enabling area contact and to exhibit good contact between the carbon nanomaterial and the metal nanobelts due to formation of the metal nanobelts on the surface of the carbon nanomaterial and superior dispersion uniformity, and a fibrous strain sensor including the conductive fiber can be obtained. The conductive fiber can be effectively applied to a strain sensor based on a principle by which resistance drastically increases with an increase in a distance between metal nanobelts aligned in a fiber direction upon tensile strain of metal nanobelts enabling area contact.

29 Claims, 10 Drawing Sheets

(51) Int. Cl.
*C08J 3/21* (2006.01)
*C08K 3/08* (2006.01)
*C08K 7/00* (2006.01)
*D01F 8/10* (2006.01)
*D01F 8/16* (2006.01)
*H01B 1/22* (2006.01)
*H01B 1/24* (2006.01)
*B82Y 30/00* (2011.01)
*B82Y 15/00* (2011.01)
*B82Y 40/00* (2011.01)

(52) U.S. Cl.
CPC ...... *D10B 2321/06* (2013.01); *D10B 2331/10* (2013.01); *D10B 2401/16* (2013.01)

(56) References Cited

U.S. PATENT DOCUMENTS

| | | | |
|---|---|---|---|
| 10,184,059 B2 * | 1/2019 | Han | C09D 11/52 |
| 2009/0117268 A1 * | 5/2009 | Lewis | C08G 61/124 |
| | | | 427/205 |
| 2016/0009934 A1 * | 1/2016 | Han | C09D 11/52 |
| | | | 252/74 |
| 2017/0073817 A1 * | 3/2017 | Han | C01B 32/174 |

FOREIGN PATENT DOCUMENTS

| | | | | |
|---|---|---|---|---|
| WO | WO-2015156562 A1 * | 10/2015 | | H01B 1/04 |
| WO | WO-2016052890 A2 * | 4/2016 | | C07C 265/02 |

\* cited by examiner

CONDUCTIVE FIBER COMPRISING METAL NANOBELT AND CARBON NANOMATERIAL COMPOSITE, METHOD FOR PRODUCING CONDUCTIVE FIBER, FIBROUS STRAIN SENSOR, AND METHOD FOR PRODUCING FIBROUS STRAIN SENSOR

REFERENCE TO RELATED APPLICATIONS

This is a continuation of pending International Patent Application PCT/KR2017/005602 filed on May 30, 2017, which designates the United States and claims priority of Korean Patent Application No. 10-2016-0068255 filed on Jun. 1, 2016, the entire contents of which are incorporated herein by reference.

FIELD OF THE INVENTION

The present invention relates to a conductive fiber comprising a metal-nanobelt-carbon-nanomaterial composite, a method of manufacturing the conductive fiber, a fibrous strain sensor, and a method of manufacturing the fibrous strain sensor. More particularly, the present invention relates to a conductive fiber comprising a metal-nanobelt-carbon-nanomaterial composite, which is able to increase conductivity through synthesis of metal nanobelts enabling area contact and to exhibit good contact between the carbon nanomaterial and the metal nanobelts due to formation of the metal nanobelts on the surface of the carbon nanomaterial and superior dispersion uniformity, a method of manufacturing the conductive fiber, a fibrous strain sensor, and a method of manufacturing the fibrous strain sensor.

BACKGROUND OF THE INVENTION

A conductive fiber may be utilized as a fibrous electrode for future e-textiles, and also as a multifunctional fiber that acts for electrodes for electromagnetic interference (EMI) shield, antistatic and ultrahigh-capacity storage batteries, sensors, batteries, heat wires or actuators. Furthermore, when manufactured in the form of a fiber or a polymer composite for an ion exchange filter for seawater desalination for industrial use, a conductive fiber may serve as a reinforcement responsible for mechanical support.

A conventional high-conductive fiber (>10,000 S/m) has been manufactured through a dry process in a manner in which carbon nanotubes (CNTs) produced through chemical vapor deposition are spun or in which carbon nanotubes formed in a furnace are collected. Such a dry process facilitates high conductivity but makes it difficult to realize mass production. In contrast, a wet process as disclosed in "Natnael Behabtu et al. Science 339, 182 (2013)" exhibits conductivity of $10^6$ S/m by subjecting a carbon nanotube dispersion solution dispersed by a superacid to liquid-crystal spinning and doping. However, the wet process is problematic in that the formation of a composite with a heterogeneous material such as a polymer, etc. is difficult.

When graphene is used in lieu of carbon nanotubes, a conductive fiber is manufactured in a manner in which a graphene oxide liquid-crystal solution is subjected to liquid-crystal spinning and then chemical reduction. In this case, electrical conductivity is not realized to a level of $10^5$ S/m or more even through the formation of a composite with a metal because of deterioration of graphene properties due to acid treatment and contact resistance between chemically treated graphenes, as disclosed in "Zhen Xu et al. Adv. Mater. 25, 3249 (2013)".

With the goal of solving such problems, a carbon nanomaterial having few defects and high quality, such as carbon nanotubes, graphene, carbon black, nano-graphite, and the like, has to be dispersed in a large amount. However, it is difficult to realize high conductivity of $10^5$ S/m or more using only the carbon nanomaterial. Accordingly, techniques for maximizing the electrical conductivity of a conductive fiber through the addition of a small amount of metal nanomaterial having high electrical conductivity, such as metal nanoparticles, metal nanorods, metal nanowires, metal nanotubes, metal nanoflakes, etc., are being developed these days.

Added to the carbon nanomaterial, however, metal nanoparticles undergo point contact, and metal nanorods, metal nanowires, metal nanotubes and metal nanoflakes undergo line contact, and thus limitations are imposed on increasing conductivity. Furthermore, in the case where a conductive fiber is manufactured by individually adding a carbon nanomaterial and a metal material, the carbon nanomaterial and the metal material are not uniformly dispersed, and thus an additional dispersant has to be used.

Meanwhile, a strain sensor, to which the technique of the conductive fiber is applied, is a sensor for detecting an electrical signal that is converted from a mechanical micro-strain. When such a strain sensor is attached to a machine, tool or structure, it is possible to measure a small numerical change, that is, strain, generated on the surface thereof, and also to determine stress, which is important for evaluating strength or stability based on the numerical change. Therefore, a strain sensor is widely used for vehicles, aircraft, and large structures such as bridges, dams, etc., and the strain sensor may be broadly utilized not only as a sensor element for converting physical quantities such as force, pressure, acceleration, displacement and torque into electrical signals, but also for experimentation, research, and measurement control.

As disclosed in Korean Patent No. 10-1500840, entitled "Manufacturing Method of Strain Sensor, Strain Sensor and Motion Sensing Apparatus using the Strain Sensor", the conventional strain sensor is manufactured using a material such as PDMS, rubber, polyurethane, stretchable fiber, Ecoflex, etc. The strain sensor measures the surface strain of a measurement object depending on changes in the resistance value of a resistor. Generally, the resistance value increases when the strain sensor is stretched by external force and decreases when the strain sensor is compressed.

However, in the case where the conventional material is applied to a strain sensor, as shown in FIG. 1, even when tensile strain is about 10%, the extent of reduction of conductivity is low, from which it can be confirmed that the resistance is not changed much. Specifically, the case where the conventional material is applied to a strain sensor is problematic in that the conventional strain sensor cannot be applied to fields in which micro-strain may be detected because the resistance is not changed much even when the tensile strain is large.

SUMMARY OF THE INVENTION

Accordingly, the present invention is intended to provide a conductive fiber comprising a metal-nanobelt-carbon-nanomaterial composite, which is able to increase the conductivity of the conductive fiber through synthesis of metal nanobelts enabling area contact and to exhibit good contact between the carbon nanomaterial and the metal nanobelts due to formation of the metal nanobelts on the surface of the carbon nanomaterial and superior dispersion uniformity, a method of manufacturing the conductive fiber, a fibrous strain sensor, and a method of manufacturing the fibrous strain sensor.

In addition, the present invention is intended to provide a conductive fiber comprising a metal-nanobelt-carbon-nanomaterial composite, which may be applied to a strain sensor based on the principle by which resistance drastically increases with an increase in the distance between metal nanobelts aligned in a fiber direction upon tensile strain of metal nanobelts enabling area contact, a method of manufacturing the conductive fiber, a fibrous strain sensor, and a method of manufacturing the fibrous strain sensor.

Therefore, the present invention provides a method of manufacturing a conductive fiber comprising a metal-nanobelt-carbon-nanomaterial composite, including preparing a composite comprising a carbon nanomaterial and metal nanobelts and manufacturing a conductive fiber by mixing the composite with a polymer.

Here, the metal nanobelts preferably have a ribbon shape so as to enable area contact.

The preparing the composite preferably includes subjecting a conductive carbon nanomaterial to surface modification in order to introduce the carbon nanomaterial with a functional group, forming a carbon nanomaterial dispersion solution reactive with metal ions by mixing and reacting the surface-modified carbon nanomaterial with an isocyanate-based compound and a pyrimidine-based compound, and forming the metal nanobelts on the surface of the carbon nanomaterial by adding a metal salt precursor and a solvent to the carbon nanomaterial dispersion solution and adding a reducing agent at a controlled addition rate. In the forming the metal nanobelts, the reducing agent is preferably added at a rate of 0.1 to 0.3 ml/min.

The isocyanate-based compound is preferably selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, poly(propylene glycol) having a toluene 2,4-diisocyanate terminal group, poly(ethylene glycol) having a toluene 2,4-diisocyanate terminal group, triphenylmethane triisocyanate, diphenylmethane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, polymethylene polyphenyl isocyanate, and mixtures thereof.

The pyrimidine-based compound is preferably selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, 2-amino-5,6-dimethyl-4-hydroxypyrimidine, and mixtures thereof.

The metal salt precursor is preferably selected from the group consisting of a gold (Au) salt precursor, a silver (Ag) salt precursor, a platinum (Pt) salt precursor, a copper (Cu) salt precursor, an aluminum (Al) salt precursor, a palladium (Pd) salt precursor, a nickel (Ni) salt precursor, and mixtures thereof. The silver salt precursor is preferably selected from the group consisting of silver nitrate ($AgNO_3$), silver perchlorate ($AgClO_4$), silver tetrafluoroborate ($AgBF_4$), silver hexafluorophosphate ($AgPF_6$), silver acetate ($CH_3COOAg$), silver trifluoromethane sulfonate ($AgCF_3SO_3$), silver sulfate ($Ag_2SO_4$), silver 2,4-pentanedionate ($CH_3COCH=COCH_3Ag$), and mixtures thereof, and the platinum salt precursor is preferably selected from the group consisting of chlorotetraamine platinum ($Pt(NH_3)4Cl_2$), dichlorotetraamine platinum hydrate ($Pt(NH_3)_4Cl_2.xH_2O$), tetraamine platinum hydroxide hydrate ($Pt(NH_3)_4(OH)_2.xH_2O$), tetraamine platinum (II) nitrate ($Pt(NH_3)_4(NO_3)_2$), bisethylene diamine platinum (II) chloride (($H_2NCH_2CH_2NH_2)_2PtCl_2$), chloroplatinic acid ($[H_3O]_2[PtCl_6](H_2O)_x$ or $H_2PtCl_6$), and mixtures thereof.

The reducing agent is preferably selected from the group consisting of sodium hydroxide (NaOH), potassium hydroxide (KOH), ammonium hydroxide ($NH_4OH$), sodium borohydride ($NaBH_4$), hydrazine ($N_2H_4$), hydroiodide (HI), ascorbic acid, a reducible organic solvent, and mixtures thereof.

The manufacturing the conductive fiber is preferably performed in a manner in which the composite is mixed with the polymer and dispersed using a paste mixer to yield a conductive fiber paste, which is then subjected to solution spinning, and the composite is preferably contained in an amount of 1 to 50 parts by weight based on 100 parts by weight of the total amount of the conductive fiber paste including the polymer and the composite.

The carbon nanomaterial is preferably selected from the group consisting of carbon nanotubes (CNTs), carbon fiber, graphene, carbon black, and mixtures thereof.

In addition, the present invention provides a conductive fiber comprising a metal-nanobelt-carbon-nanomaterial composite, formed by mixing a composite comprising a carbon nanomaterial and metal nanobelts with a polymer.

Here, the composite is preferably prepared in a manner in which a surface-modified carbon nanomaterial is mixed and reacted with an isocyanate-based compound and a pyrimidine-based compound to yield a carbon nanomaterial dispersion solution reactive with metal ions, and a metal salt precursor and a solvent are added to the carbon nanomaterial dispersion solution and a reducing agent is added at a controlled addition rate, thus forming the metal nanobelts on the surface of the carbon nanomaterial.

In addition, the present invention provides a method of manufacturing a fibrous strain sensor, including preparing a composite comprising a carbon nanomaterial and metal nanobelts, manufacturing a conductive fiber by mixing the composite with a polymer, and fabricating a fibrous strain sensor using the conductive fiber.

Here, the preparing the composite preferably includes subjecting a conductive carbon nanomaterial to surface modification in order to introduce the carbon nanomaterial with a functional group, forming a carbon nanomaterial dispersion solution reactive with metal ions by mixing and reacting the surface-modified carbon nanomaterial with an isocyanate-based compound and a pyrimidine-based compound, and forming the metal nanobelts on the surface of the carbon nanomaterial by adding a metal salt precursor and a solvent to the carbon nanomaterial dispersion solution and adding a reducing agent at a controlled addition rate. In the forming the metal nanobelts, the reducing agent is preferably added at a rate of 0.1 to 5 ml/min based on 100 ml of the reaction solution.

The isocyanate-based compound is preferably selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, poly(propylene glycol) having a toluene 2,4-diisocyanate terminal group, poly(ethylene glycol) having a toluene 2,4-diisocyanate terminal group, triphenylmethane triisocyanate, diphenylmethane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, polymethylene polyphenyl isocyanate, and mixtures thereof.

The pyrimidine-based compound is preferably selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, 2-amino-5,6-dimethyl-4-hydroxypyrimidine, and mixtures thereof.

The metal salt precursor is preferably selected from the group consisting of a gold (Au) salt precursor, a silver (Ag) salt precursor, a platinum (Pt) salt precursor, a copper (Cu) salt precursor, an aluminum (Al) salt precursor, a palladium (Pd) salt precursor, a nickel (Ni) salt precursor, and mixtures thereof, and the reducing agent is preferably selected from the group consisting of sodium hydroxide (NaOH), potassium hydroxide (KOH), ammonium hydroxide (NH$_4$OH), sodium borohydride (NaBH$_4$), hydrazine (N$_2$H$_4$), hydroiodide (HI), ascorbic acid, a reducible organic solvent, and mixtures thereof.

The manufacturing the conductive fiber is preferably performed in a manner in which the composite is mixed with the polymer and dispersed using a paste mixer to yield a conductive fiber paste, which is then subjected to solution spinning, and the composite is preferably contained in an amount of 1 to 50 parts by weight based on 100 parts by weight of the total amount of the conductive fiber paste including the polymer and the composite.

The carbon nanomaterial is preferably selected from the group consisting of carbon nanotubes (CNTs), carbon fiber, graphene, carbon black, and mixtures thereof.

In addition, the present invention provides a fibrous strain sensor comprising a metal-nanobelt-carbon-nanomaterial composite, including a conductive fiber formed by mixing a composite comprising a carbon nanomaterial and metal nanobelts with a polymer.

Here, the composite is preferably prepared in a manner in which a surface-modified carbon nanomaterial is mixed and reacted with an isocyanate-based compound and a pyrimidine-based compound to yield a carbon nanomaterial dispersion solution reactive with metal ions, and a metal salt precursor and a solvent are added to the carbon nanomaterial dispersion solution and a reducing agent is added at a controlled addition rate, thus forming the metal nanobelts on the surface of the carbon nanomaterial.

Furthermore, the metal nanobelts preferably have a ribbon shape so as to enable area contact, and the conductive fiber preferably has a resistance change of 300% or more in response to tensile strain.

According to the present invention, a conductive fiber comprising a metal-nanobelt-carbon-nanomaterial composite, which is able to increase conductivity of the conductive fiber through synthesis of metal nanobelts enabling area contact and to exhibit good contact between the carbon nanomaterial and the metal nanobelts due to formation of the metal nanobelts on the surface of the carbon nanomaterial and superior dispersion uniformity, and a fibrous strain sensor including the conductive fiber can be obtained.

Also, the conductive fiber of the present invention can be effectively applied to a strain sensor based on the principle by which resistance drastically increases with an increase in the distance between metal nanobelts aligned in a fiber direction upon tensile strain of metal nanobelts enabling area contact.

DETAILED DESCRIPTION OF THE INVENTION

Hereinafter, a detailed description will be given of a conductive fiber comprising a metal-nanobelt-carbon-nanomaterial composite, a method of manufacturing the conductive fiber, a fibrous strain sensor and a method of manufacturing the fibrous strain sensor according to embodiments of the present invention. Here, the term "metal nanobelt" refers to one having a ribbon shape so as to enable area contact. The conductive fiber is preferably manufactured in a manner in which a surface-modified carbon nanomaterial is mixed and reacted with an isocyanate-based compound and a pyrimidine-based compound to yield a carbon nanomaterial dispersion solution reactive with metal ions, and a metal salt precursor and a solvent are added to the carbon nanomaterial dispersion solution and a reducing agent is added at a controlled addition rate to thus form the metal nanobelts on the surface of the carbon nanomaterial, after which the resulting carbon-nanomaterial-metal-nanobelt composite is mixed with a polymer. A fibrous strain sensor including the conductive fiber is also formed.

Figure 1:
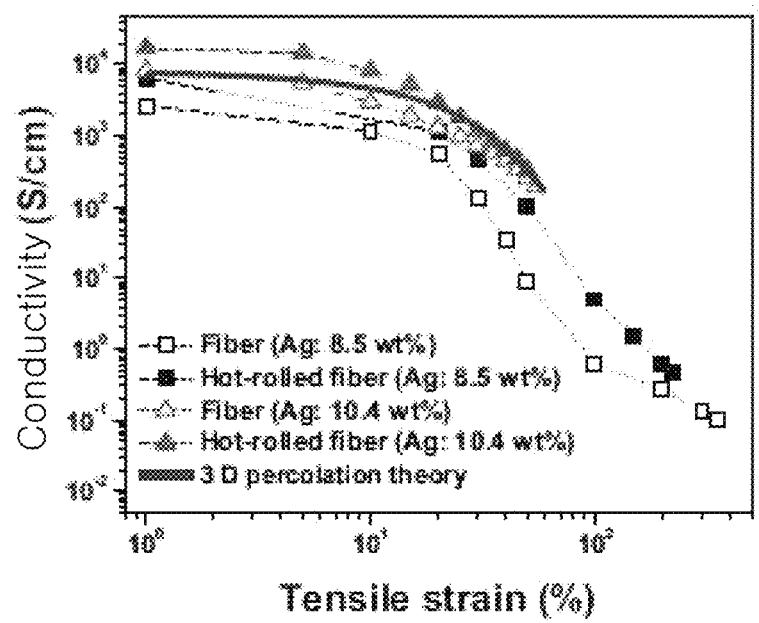
FIG. 1 is a graph showing resistance depending on changes in tensile strain of a fiber for a strain sensor according to a conventional technique.
Figure 2:
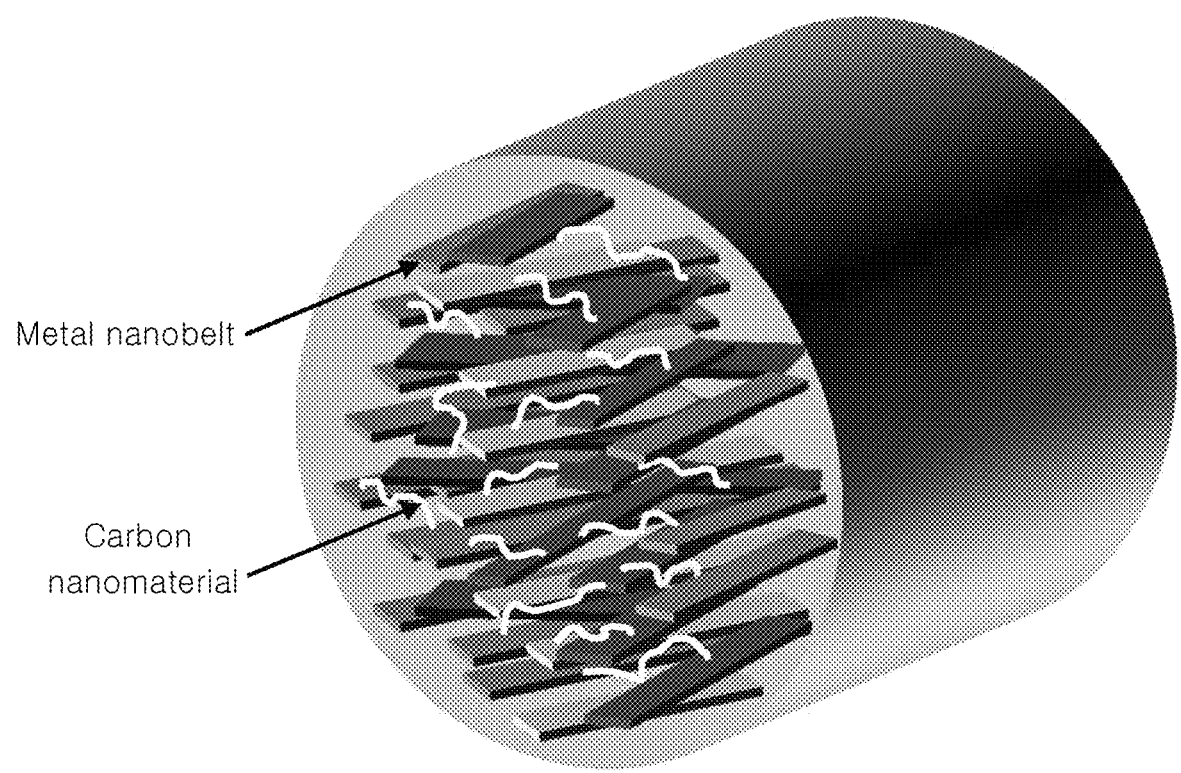
FIG. 2 is a perspective view of a conductive fiber according to an embodiment of the present invention.

As shown in FIG. 2, a conductive fiber comprising a carbon-nanomaterial-metal-nanobelt composite and a fibrous strain sensor including the conductive fiber are manufactured through the following steps.

Figure 3:
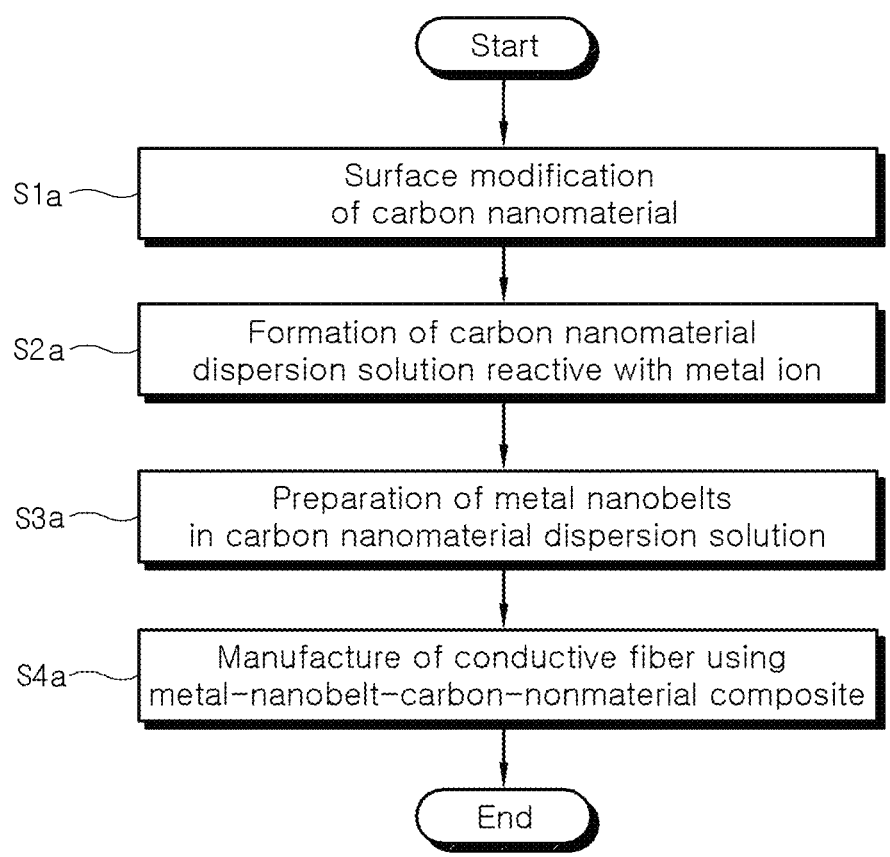
FIG. 3 is a flowchart showing a process of manufacturing a conductive fiber according to an embodiment of the present invention.

Specifically, in order to manufacture a conductive fiber, as shown in FIG. 3, a carbon nanomaterial is subjected to surface modification (S1a).

In order to introduce a carbon nanomaterial with a functional group reactive with a metal precursor, the carbon nanomaterial is subjected to surface modification. The surface modification of the carbon nanomaterial is performed through a different process depending on the kind of carbon nanomaterial. Here, the carbon nanomaterial is selected from the group consisting of graphene, carbon nanotubes (CNTs), carbon fiber, carbon black, and mixtures thereof.

A carbon nanomaterial dispersion solution reactive with metal ions is formed (S2a).

The surface-modified carbon nanomaterial is mixed and reacted with an isocyanate-based compound and a pyrimidine-based compound to yield a carbon nanomaterial dispersion solution reactive with metal ions. Here, the carbon nanomaterial dispersion solution is prepared in a manner in which the carbon nanomaterial is dispersed in a solvent, mixed with an isocyanate-based compound, heated and stirred to thus introduce an isocyanate group to the carbon nanomaterial. Then, a pyrimidine-based compound is further added thereto, followed by a bonding reaction through heating and stirring, thus forming a carbon nanomaterial dispersion solution reactive with metal ions.

Here, the isocyanate-based compound is preferably selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenylmethane-2,4'-diisocyanate (MDI), 2,2'-diphenylmethane diisocyanate (MDI), diphenylmethane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, poly(propylene glycol) having a toluene 2,4-diisocyanate terminal group, poly(ethylene glycol) having a toluene 2,4-diisocyanate terminal group, triphenylmethane triisocyanate, diphenylmethane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, polymethylene polyphenyl isocyanate, and mixtures thereof.

The pyrimidine-based compound is preferably selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, 2-amino-5,6-dimethyl-4-hydroxypyrimidine, and mixtures thereof.

The carbon nanomaterial is preferably contained in an amount of 0.001 to 10 parts by weight based on 100 parts by weight of the dispersion solution. If the amount of the carbon nanomaterial is less than 0.001 parts by weight, metal nanoparticles having a uniform diameter cannot be obtained due to the low carbon nanomaterial content. On the other hand, if the amount thereof exceeds 10 parts by weight, the amount of the carbon nanomaterial is high relative to the amount of metal nanoparticles to be formed, making it difficult to apply the resulting composite to various end uses.

Metal nanobelts are prepared in the carbon nanomaterial dispersion solution (S3a).

The carbon nanomaterial dispersion solution is added with a metal salt precursor, a reducing agent and a solvent, thus preparing metal nanobelts. Here, the metal nanobelts may be used without limitation, so long as they may be prepared using a precursor of gold (Au), silver (Ag), platinum (Pt), copper (Cu), aluminum (Al), palladium (Pd), nickel (Ni), etc.

As such, the metal salt precursor and the solvent may be added to the carbon nanomaterial dispersion solution regardless of the rate of addition thereof, but the rate of addition of the reducing agent is regarded as very important. Hence, the reducing agent is added at a controlled addition rate. When the reducing agent is added at a high rate, reactivity between the carbon nanomaterial and the metal salt precursor increases, thus obtaining a metal having a rounded particle shape. Briefly, metal particles, not metal belts, are formed on the surface of the carbon nanomaterial. Accordingly, it is important to adjust the rate of addition of the reducing agent in order to obtain metal nanobelts, not metal particles. The rate of addition of the reducing agent preferably falls in the range of 0.1 to 0.3 ml/min. If the rate of addition thereof is less than 0.1 ml/min, the manufacturing time may increase, undesirably deteriorating productivity. On the other hand, if the rate of addition thereof exceeds 0.3 ml/min, the reactivity between the carbon nanomaterial and the metal salt precursor increases, and thus metal particles, rather than metal nanobelts, are obtained, which is undesirable. Hence, the rate of addition of the reducing agent suitable for synthesizing the metal nanobelts on the surface of the carbon nanomaterial is most preferably set to the range of 0.1 to 0.3 ml/min.

The silver precursor for use in manufacturing silver metal nanoparticles is preferably selected from the group consisting of silver nitrate ($AgNO_3$), silver perchlorate ($AgClO_4$), silver tetrafluoroborate ($AgBF_4$), silver hexafluorophosphate ($AgPF_6$), silver acetate ($CH_3COOAg$), silver trifluoromethane sulfonate ($AgCF_3SO_3$), silver sulfate ($Ag_2SO_4$), silver 2,4-pentanedionate ($CH_3COCH=COCH_3Ag$), and mixtures thereof.

The platinum precursor for use in manufacturing platinum metal nanoparticles is preferably selected from the group consisting of:

chlorotetraamine platinum ($Pt(NH_3)4Cl_2$), dichlorotetraamine platinum hydrate ($Pt(NH_3)_4Cl_2.xH_2O$), tetraamine platinum hydroxide hydrate ($Pt(NH_3)_4(OH)_2.xH_2O$), tetraamine platinum (II) nitrate ($Pt(NH_3)_4(NO_3)_2$), bisethylene diamine platinum (II) chloride (($H_2NCH_2CH_2NH_2)_2PtCl_2$), chloroplatinic acid (($H_3O)_2[PtCl_6](H_2O)_x$ or $H_2PtCl_6$), and mixtures thereof.

The reducing agent is preferably selected from the group consisting of sodium hydroxide (NaOH), potassium hydroxide (KOH), ammonium hydroxide ($NH_4OH$), sodium borohydride ($NaBH_4$), hydrazine ($N_2H_4$), hydroiodide (HI), ascorbic acid, a reducible organic solvent, and mixtures thereof.

Thereafter, the metal nanobelts with the carbon nanomaterial are isolated from the reducing agent, the solvent, and the remaining metal precursor, which are involved in the reaction.

A conductive fiber is manufactured using the metal-nanobelt-carbon-nanomaterial composite (S4a).

In order to manufacture the conductive fiber, a polymer for a fiber is provided, mixed with the metal-nanobelt-carbon-nanomaterial composite, and dispersed using a paste mixer, thus obtaining a conductive fiber paste. Here, the metal-nanobelt-carbon-nanomaterial composite is preferably contained in an amount of 1 to 50 parts by weight based on 100 parts by weight of the total amount of the conductive fiber paste including the polymer and the composite. If the amount of the metal-nanobelt-carbon-nanomaterial composite is less than 1 part by weight, the composites in the conductive fiber do not come into contact with each other, resulting in low conductivity. On the other hand, if the amount thereof exceeds 50 parts by weight, the amount of the composite is greater than the amount of the polymer, and thus the resulting conductive fiber is not flexible, and may break. Furthermore, if the amount thereof exceeds 50 parts by weight, it is difficult to form a fiber. The conductive fiber paste thus prepared is subjected to solution spinning, thereby forming a conductive fiber.

In some cases, a conductive fiber may be manufactured by further adding the conductive fiber paste with any one carbon nanomaterial selected from the group consisting of graphene, carbon nanotubes (CNTs), carbon fiber, carbon black, and mixtures thereof. When the conductive fiber paste is mixed with the above carbon nanomaterial and is then subjected to solution spinning in this way, the solvent present in the paste is solidified while moving to the surface during the solidification in a coagulation bath for solution spinning. Thus, the metal nanobelts of the paste are affinitive with the solvent and thus move to the surface along with the solvent, and the middle region of the fiber is filled with the additionally mixed carbon nanomaterial. Thereby, the carbon-nanomaterial-metal-nanobelt composite, having very high conductivity, is intensively guided to the fiber surface, and thus the conductive fiber may exhibit very high electrical conductivity.

Figure 4:
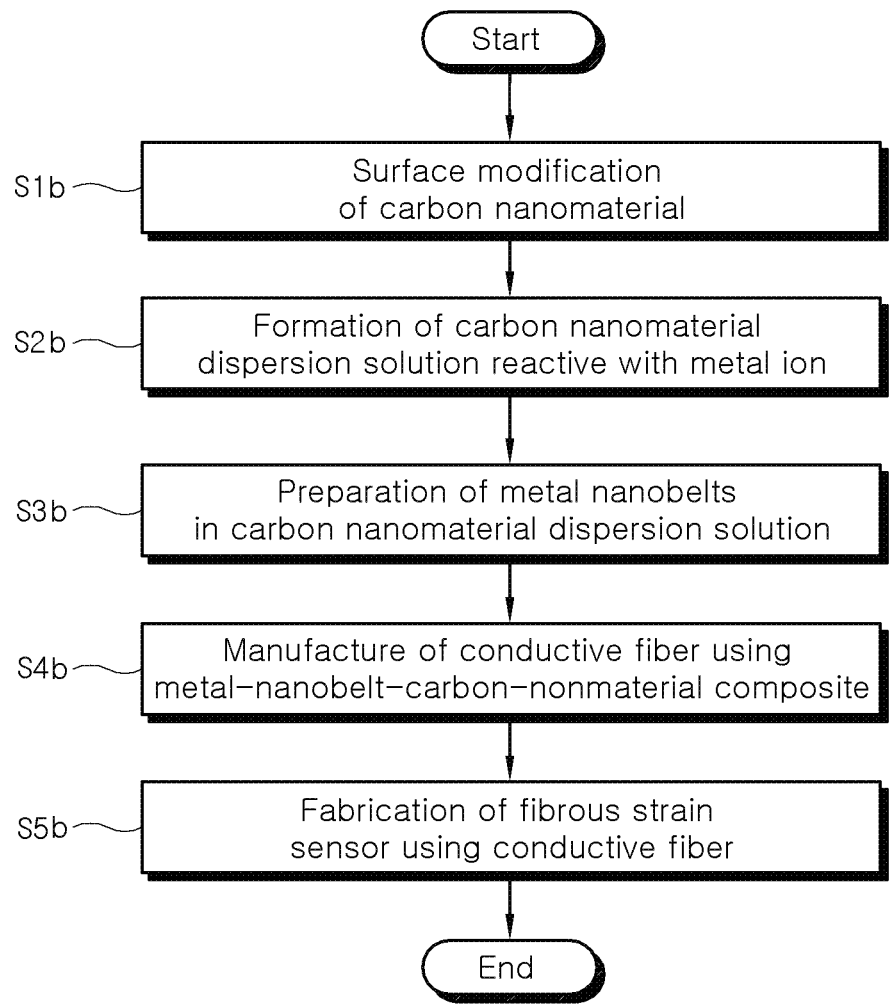
FIG. 4 is a flowchart showing a process of manufacturing a fibrous strain sensor according to an embodiment of the present invention.

FIG. 4 shows the process of manufacturing a fibrous strain sensor. Here, surface modification of a carbon nanomaterial (S1b), formation of a carbon nanomaterial dispersion solution reactive with metal ions (S2b), preparation of metal nanobelts in the carbon nanomaterial dispersion solution (S3b), and preparation of a conductive fiber using the metal-nanobelt-carbon-nanomaterial composite (S4b) are the same as S1a to S4a, but only S5b is different. Accordingly, a description of S1b to S4b is omitted, and only S5b is described.

After S1b to S4b, a fibrous strain sensor is fabricated using the conductive fiber (S5).

The conductive fiber obtained through S4b is used as a flexible electrode, and metal wires are fixed to both ends of the flexible electrode using a metal paste. For example, a strain sensor is fabricated in a manner in which copper wires are fixed using a silver paste, after which molding treatment is performed using a polymer so as to prevent detachment of the metal paste. However, this configuration and structure are only an example of a strain sensor, and it is possible to manufacture a strain sensor without limitation in various configurations and structures including the conductive fiber of the present invention.

A better understanding of the present invention will be given through the following examples.

<Example 1>: Conductive Fiber

In Example 1 of the present invention, silver nanobelts with carbon nanotubes (CNTs) for use in a conductive fiber were first synthesized. The carbon nanotubes were introduced with a functional group able to interact with silver ions or silver particles, and were then added upon synthesis of silver particles, followed by adjusting the rate of reduction, thereby preparing silver nanobelts.

Specifically, 5 g of multi-walled carbon nanotubes, serving as a carbon nanomaterial, was mixed with 100 ml of a 60% nitric acid solution, heated to 100° C. with stirring for 24 hr, cooled to room temperature, and then diluted with 400 ml of distilled water. The diluted solution was filtered four or more times with filter paper, whereby the nitric acid solution was removed from the carbon nanotubes, followed by drying, thus obtaining carboxyl group (—COOH)-introduced multi-walled carbon nanotubes. The carboxyl group-introduced carbon nanotubes were dispersed at 100 mg/L in a dimethylformamide (DMF) solvent, mixed with toluene diisocyanate, and allowed to react with stirring at 100° C. for 12 hr, thus introducing an isocyanate group.

Thereafter, the isocyanate group-introduced carbon nanotubes were mixed with 2-amino-4-hydroxy-6-methyl-pyrimidine and subjected to a bonding reaction with stirring at 100° C. for 20 hr, thus introducing a 2-ureido-4[1H]pyrimidinone group to the surface and the ends of the carbon nanotubes. Then, the functional group-introduced carbon nanotubes thus obtained were dispersed at 0.1 g/L in a dimethylformamide solvent and added with 0.1 mol/L of silver nitrate ($AgNO_3$), thus preparing a silver salt mixed solution.

Figure 5:
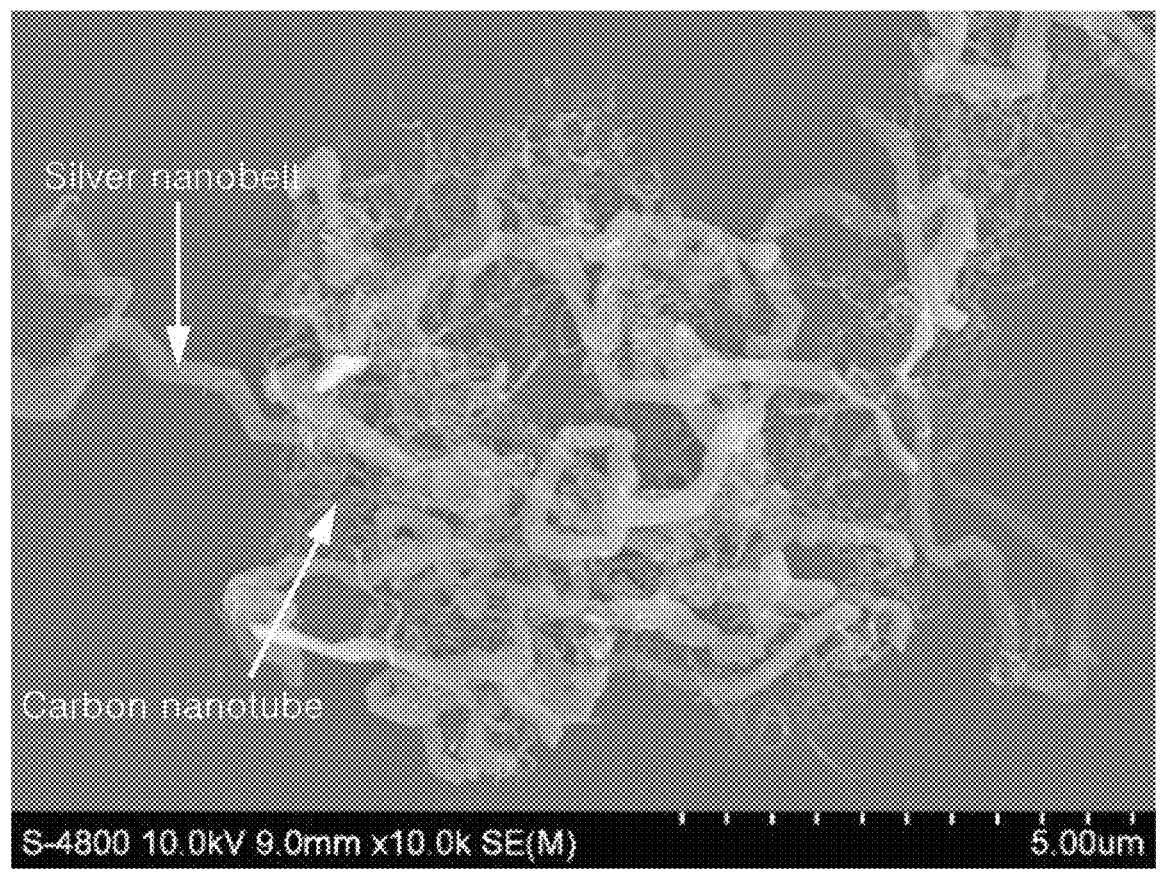
FIG. 5 is a scanning electron microscopy (SEM) image of a carbon-nanotube-silver-nanobelt composite.

The silver salt mixed solution thus prepared was added with hydrazine as a reducing agent at a rate of 0.2 ml/min at room temperature and stirred so that the rate of reduction was slowed down, thus forming a nanobelt structure. The silver nanobelts provided in the form of a composite with the carbon nanotubes in the prepared reaction solution were subjected to centrifugation or filtration to remove the solvent therefrom, thus obtaining a composite as shown in FIG. 5.

In order to manufacture the conductive fiber using the prepared carbon-nanotube-silver-nanobelt composite, 10 wt % of polyvinyl alcohol was dissolved in dimethylsulfoxide to yield a spinning dope for a fiber, in which the carbon-nanotube-silver-nanobelt composite was then dispersed in an amount of 10 to 30 vol % based on the total volume of the fiber using a paste mixer, thus preparing a conductive fiber paste having solid content of 15 wt %. Subsequently, the carbon nanotube-silver nanobelt/polyvinylalcohol paste was spun in a methanol coagulation bath via a syringe nozzle using a metering pump and thus solidified, and was then thermally dried at 70° C., thereby obtaining a conductive fiber.

Figure 6:
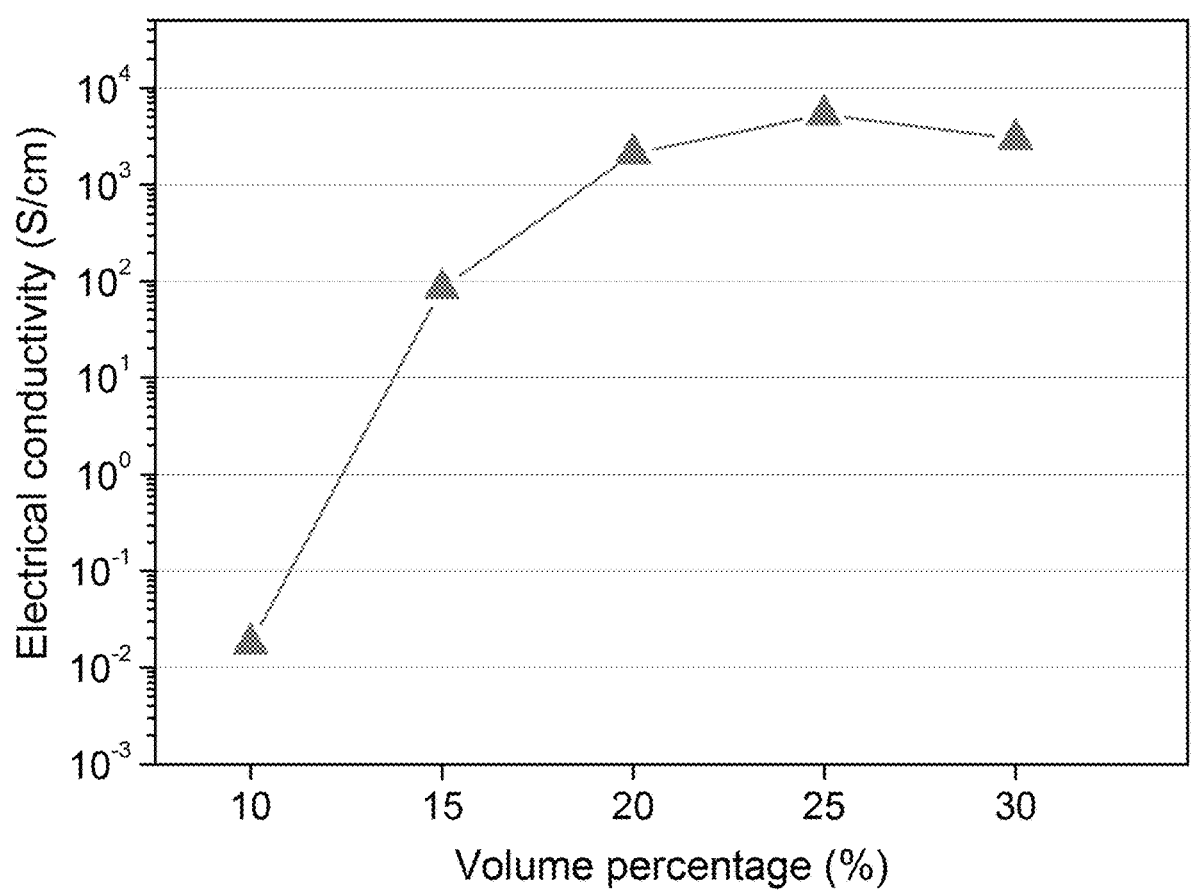
FIG. 6 is a graph showing the electrical conductivity of a conductive fiber depending on the amount of the carbon-nanotube-silver-nanobelt composite according to a first embodiment of the present invention.
Figure 7A:
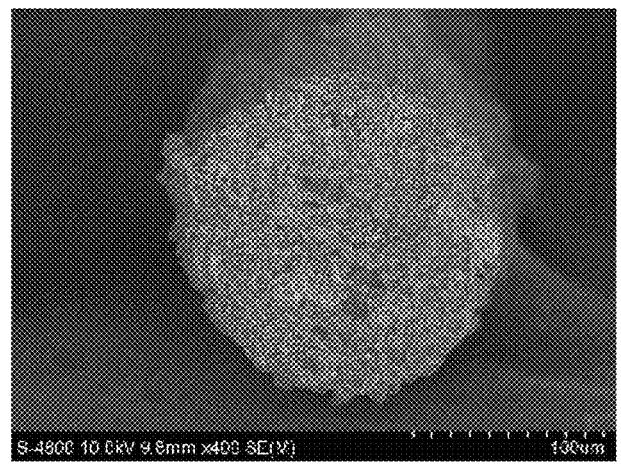
FIGS. 7a and 7b are SEM images of the conductive fiber comprising carbon nanotubes and silver nanobelts.
Figure 7B:
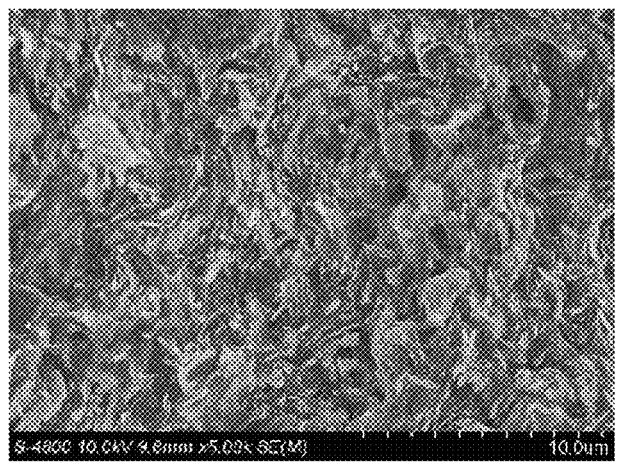

Based on the results of measurement of electrical conductivity of the conductive fiber, as shown in FIG. 6, when the amount of the carbon-nanotube-silver-nanobelt composite was 20% or more, high electrical conductivity of 1000 S/cm or more resulted. This is because the silver contained in the composite has a nanobelt structure. As shown in the SEM images of FIGS. 7a and 7b illustrating the cross-section of the conductive fiber, the two-dimensional silver nanobelts are observed to be interconnected through area contact.

<Example 2>: Conductive Fiber

In Example 2 of the present invention, a conductive fiber was manufactured in the same manner as in Example 1, with the exception that a carbon-nanotube-copper-nanobelt composite for a conductive fiber was prepared using a mixture of $CuCl \cdot H_2O$ and $Ni(Oac)_2$ or $Ni(NO_3)_2$ as a metal salt. The prepared composite was subjected to the same procedures as Example 1, thus manufacturing a conductive fiber.

<Example 3>: Conductive Fiber

In Example 3 of the present invention, a conductive fiber was manufactured in the same manner as in Example 1, with the exception that 2-ureido-4[1H]pyrimidinone group-introduced graphene oxide was prepared by sequentially reacting graphene oxide, in lieu of the carboxyl group-introduced carbon nanotubes, with an isocyanate compound and 2-amino-4-hydroxy-6-methyl-pyrimidine. The prepared functionalized graphene was added with a silver salt and a reducing agent in the same manner as in Example 1, thus obtaining a graphene-silver-nanobelt composite. The composite thus obtained was subjected to the same procedures as Example 1, thus manufacturing a conductive fiber. Here, polyurethane was used as a polymer.

<Comparative Example>: Conductive Fiber

In Comparative Example of the present invention, a conductive fiber was manufactured in the same manner as in Example 1, with the exception that a conductive fiber paste was prepared using silver flakes (Ag flakes) in lieu of the silver nanobelts. Even when the silver flakes were added in the same amount, electrical conductivity was measured to be low compared to when using the silver nanobelts.

<Example 4>: Fibrous Strain Sensor

Specifically, 5 g of multi-walled carbon nanotubes, serving as a carbon nanomaterial, was mixed with 100 ml of a 60% nitric acid solution, heated to 100° C. with stirring for 24 hr, cooled to room temperature, and then diluted with 400 ml of distilled water. The diluted solution was filtered four or more times with filter paper, whereby the nitric acid solution was removed from the carbon nanotubes, followed by drying, thus obtaining carboxyl group (—COOH)-introduced multi-walled carbon nanotubes. The carboxyl group-introduced carbon nanotubes were dispersed at 100 mg/L in a dimethylformamide (DMF) solvent, mixed with toluene diisocyanate, and allowed to react with stirring at 100° C. for 12 hr, thus introducing an isocyanate group.

Thereafter, the isocyanate group-introduced carbon nanotubes were mixed with 2-amino-4-hydroxy-6-methyl-pyrimidine and subjected to a bonding reaction with stirring at 100° C. for 20 hr, thus introducing a 2-ureido-4[1H]pyrimidinone group to the surface and the ends of the carbon nanotubes. Then, the functional group-introduced carbon nanotubes thus prepared were dispersed at 0.1 g/L in a dimethylformamide solvent, and added with 0.1 mol/L of silver nitrate ($AgNO_3$), thus preparing a silver salt mixed solution.

The silver salt mixed solution thus prepared was added with hydrazine as a reducing agent at a rate of 0.2 ml/min at room temperature, and stirred so that the rate of reduction was slowed down, thus forming a nanobelt structure. The silver nanobelt provided in the form of a composite with the carbon nanotubes in the prepared reaction solution was subjected to centrifugation or filtration to remove the solvent therefrom, thus obtaining a composite as shown in FIG. 5.

Figure 8A:
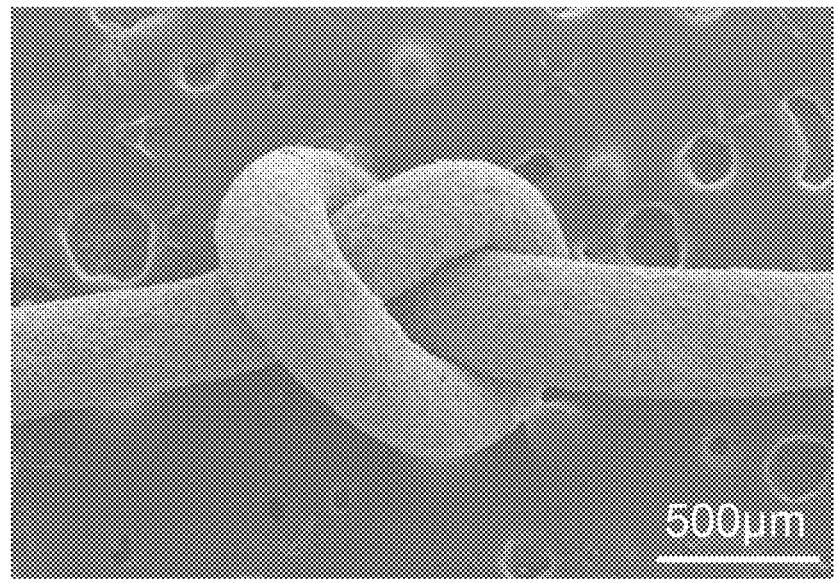
FIGS. 8a and 8b are SEM images of the conductive fiber.
Figure 8B:
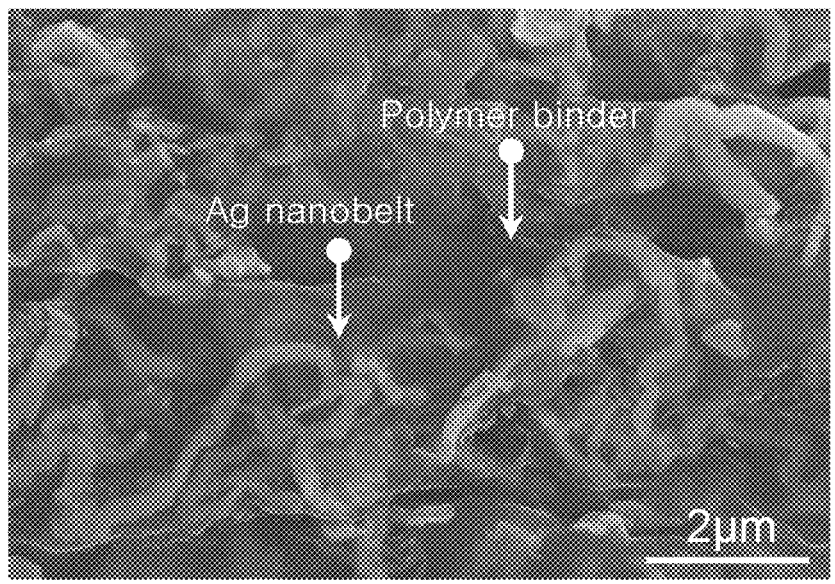

In order to manufacture the conductive fiber using the prepared carbon-nanotube-silver-nanobelt composite, 10 wt % of polyurethane was dissolved in dimethylformamide to yield a spinning dope for a fiber, in which the carbon-nanotube-silver-nanobelt composite was then dispersed in an amount of 10 to 30 vol % based on the total volume of the fiber using a paste mixer, thus preparing a conductive fiber paste having solid content of 15 wt %. Subsequently, the carbon nanotube-silver nanobelt/polyurethane paste was spun in a methanol coagulation bath via a syringe nozzle using a metering pump and thus solidified, and was then thermally dried at 70° C., thereby obtaining a conductive fiber. The conductive fiber thus obtained is shown in SEM images of FIG. 8, FIG. 8a illustrating a low-magnification image of the conductive fiber and FIG. 8b illustrating a high-magnification image of the conductive fiber. As shown in FIG. 8b, the silver nanobelts can be confirmed to be present in the conductive fiber of the present invention.

Figure 9:
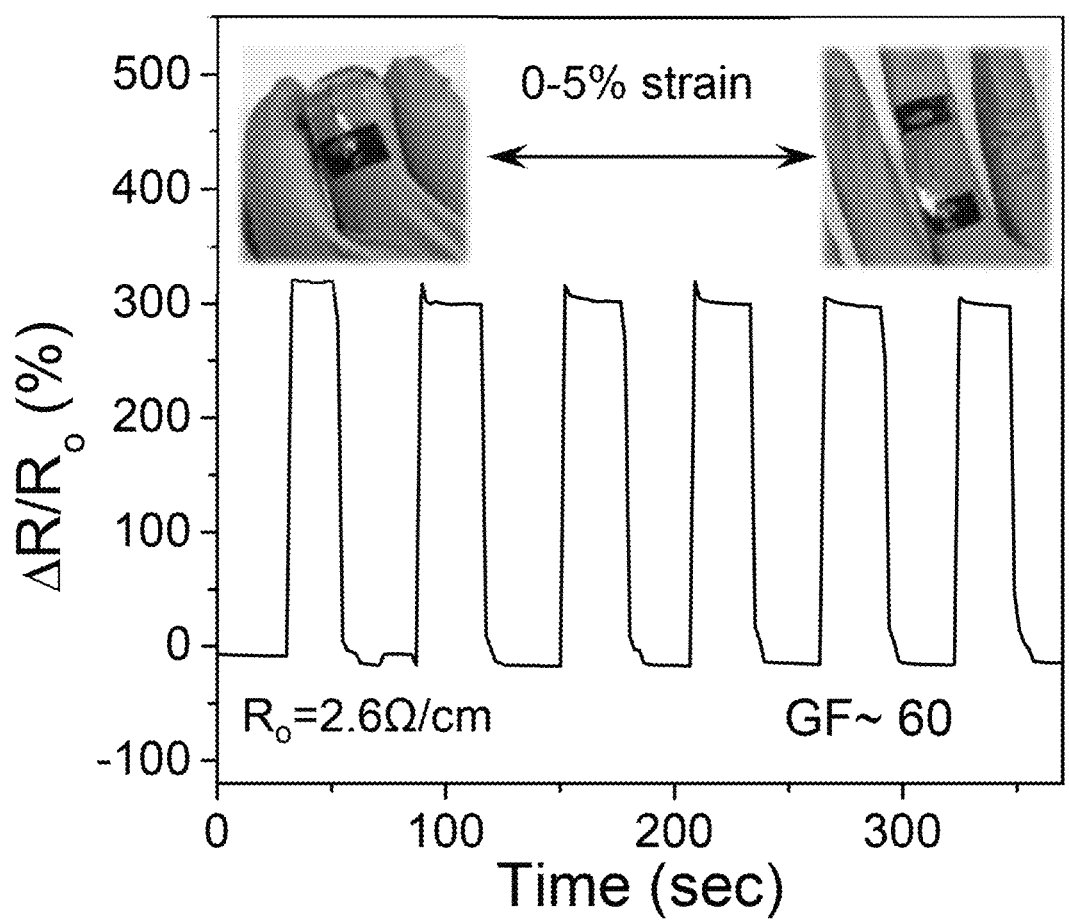
FIGS. 9 and 10 are graphs showing resistance depending on changes in the tensile strain of the strain sensor.
Figure 10:
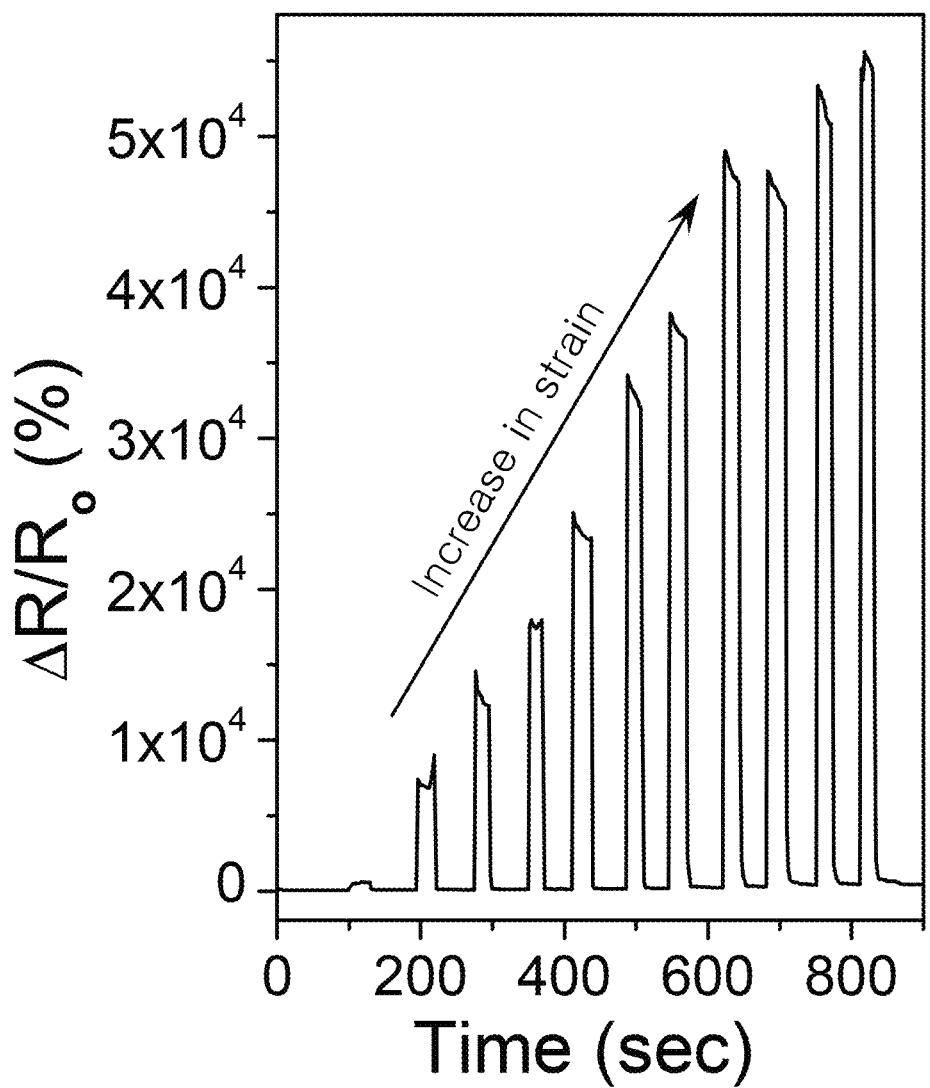

Based on the results of measurement of electrical conductivity of the conductive fiber, when the amount of the carbon-nanotube-silver-nanobelt composite was 20 wt % or more, high electrical conductivity of 1000 S/cm or more resulted. As shown in FIG. 9, the conductive fiber of the manufactured strain sensor was connected to a finger, and changes in resistance depending on the bending of the finger were measured. Consequently, the resistance change was determined to be 300% or more even when the tensile strain of the conductive fiber was 5% or less, resulting in excellent sensitivity. The gauge factor (GF), as the main factor of the strain sensor, was about 60, thus manifesting excellent strain sensor properties. Furthermore, the resistance change drastically increases with an increase in the strain, and the resistance was lowered again to the original level even upon restoration after at least 10000-fold change, thus exhibiting very good restoration performance. FIG. 10 is a graph showing the resistance change depending on the conductive fiber of the strain sensor. The resistance change becomes sensitively increased with an increase in the tensile strain, and when the conductive fiber is restored to the original state thereof, the resistance is decreased again, from which the resistance change of the conductive fiber included in the strain sensor of the present invention can be evaluated to be very sensitive in response to the tensile strain.

In a conventional conductive fiber comprising a carbon nanomaterial and a metal material, the metal material includes metal nanoparticles or metal nanowires to thus implement point contact or line contact, and limitations are imposed on increasing conductivity. Also, when a conductive fiber is manufactured by individually adding a carbon nanomaterial and a metal material, the carbon nanomaterial and the metal material are not uniformly dispersed, and thus an additional dispersant has to be used. However, the present invention is advantageous because of inclusion of a carbon-nanomaterial-metal-nanobelt composite that is able to increase the conductivity of the conductive fiber through synthesis of metal nanobelts enabling area contact and to exhibit good contact between the carbon nanomaterial and the metal nanobelts due to formation of the metal nanobelts on the surface of the carbon nanomaterial and superior dispersion uniformity.

In a conventional strain sensor made of a material such as PDMS, rubber, polyurethane, stretchable fiber, Ecoflex, etc., when the strain sensor undergoes tensile strain, the distance between the particles of the material becomes close in a direction perpendicular to the direction in which tensile strain occurs, and thus resistance is decreased somewhat. However, the strain sensor of the present invention is drastically increased in resistance based on the principle by which the distance between nanobelts aligned in a fiber direction increases upon tensile strain, and thus micro-strain may be easily detected not only when such a strain sensor is applied to a machine, tool or structure, but also when the same is utilized as a wearable textile sensor or attached to human bodies.

The present invention pertains to a conductive fiber comprising a metal-nanobelt-carbon-nanomaterial composite, a method of manufacturing the conductive fiber, a fibrous strain sensor, and a method of manufacturing the fibrous strain sensor. More particularly, the present invention can be useful in the fields of a conductive fiber comprising a metal-nanobelt-carbon-nanomaterial composite, which is able to increase conductivity through synthesis of metal nanobelts enabling area contact and to exhibit good contact between the carbon nanomaterial and the metal nanobelts due to formation of the metal nanobelts on the surface of the carbon nanomaterial and superior dispersion uniformity, a method of manufacturing the conductive fiber, a fibrous strain sensor, and a method of manufacturing the fibrous strain sensor.

What is claimed is:

1. A method of manufacturing a conductive fiber comprising a metal-nanobelt-carbon-nanomaterial composite, the method comprising:
   subjecting a conductive carbon nanomaterial to surface modification in order to introduce the carbon nanomaterial with a functional group;
   forming a carbon nanomaterial dispersion solution reactive with a metal ion by mixing and reacting the surface-modified carbon nanomaterial with an isocyanate-based compound and a pyrimidine-based compound;
   forming metal nanobelts on surfaces of the carbon nanomaterial in the carbon nanomaterial dispersion solution by adding a metal salt precursor and a solvent to the carbon nanomaterial dispersion solution and by further adding a reducing agent at a controlled addition rate to provide a desired reactivity rate between the metal salt precursor and the carbon nanomaterial in the carbon nanomaterial dispersion solution;
   isolating the metal nanobelts with the carbon material from the reducing agent, the solvent and a remaining amount of the metal salt precursor to form the metal-nanobelt-carbon-nanomaterial composite; and
   manufacturing the conductive fiber by mixing the metal-nanobelt-carbon-nanomaterial composite with a polymer.

2. The method of claim 1, wherein the metal nanobelts have a ribbon shape so as to enable area contact.

3. The method of claim 1, wherein the polymer is polyurethane.

4. The method of claim 1, wherein in the forming the metal nanobelts, the reducing agent is added at a rate of 0.1 to 0.3 ml/min.

5. The method of claim 1, wherein the isocyanate-based compound is selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenyl methane diisocyanate, perhydro-4,4'-diphenyl methane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenyl methane-2,4'-diisocyanate (MDI), 2,2'-diphenyl methane diisocyanate (MDI), diphenyl methane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, poly(propylene glycol) having a toluene 2,4-diisocyanate terminal group, poly(ethylene glycol) having a toluene 2,4-diisocyanate terminal group, triphenylmethane triisocyanate, diphenyl methane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, polymethylene polyphenyl isocyanate, and mixtures thereof.

6. The method of claim 1, wherein the pyrimidine-based compound is selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, 2-amino-5,6-dimethyl-4-hydroxypyrimidine, and mixtures thereof.

7. The method of claim 1, wherein the metal salt precursor is selected from the group consisting of a gold (Au) salt precursor, a silver (Ag) salt precursor, a platinum (Pt) salt precursor, a copper (Cu) salt precursor, an aluminum (Al) salt precursor, a palladium (Pd) salt precursor, a nickel (Ni) salt precursor, and mixtures thereof.

8. The method of claim 7, wherein the silver salt precursor is selected from the group consisting of silver nitrate ($AgNO_3$), silver perchlorate ($AgClO_4$), silver tetrafluoroborate ($AgBF_4$), silver hexafluorophosphate ($AgPF_6$), silver acetate ($CH_3COOAg$), silver trifluoromethane sulfonate ($AgCF_3SO_3$), silver sulfate ($Ag_2SO_4$), silver 2,4-pentanedionate ($CH_3COCH=COCH_3Ag$), and mixtures thereof.

9. The method of claim 7, wherein the platinum salt precursor is selected from the group consisting of chlorotetraamine platinum ($Pt(NH_3)4Cl_2$), dichlorotetraamine platinum hydrate ($Pt(NH_3)_4Cl_2 \cdot xH_2O$), tetraamine platinum hydroxide hydrate (Pt(NH$_3$)$_4$(OH)$_2$·xH$_2$O), tetraamine platinum (II) nitrate (Pt(NH$_3$)$_4$(NO$_3$)$_2$), bisethylene diamine platinum (II) chloride ((H$_2$NCH$_2$CH$_2$NH$_2$)$_2$PtCl$_2$), chloroplatinic acid ([H$_3$O]$_2$[PtCl$_6$](H$_2$O)$_x$ or H$_2$PtCl$_6$), and mixtures thereof.

10. The method of claim 1, wherein the reducing agent is selected from the group consisting of sodium hydroxide (NaOH), potassium hydroxide (KOH), ammonium hydroxide (NH$_4$OH), sodium borohydride (NaBH$_4$), hydrazine (N$_2$H$_4$), hydroiodide (HI), ascorbic acid, a reducible organic solvent, and mixtures thereof.

11. The method of claim 1, wherein the manufacturing the conductive fiber is performed in a manner in which the metal-nanobelt-carbon-nanomaterial composite is mixed with the polymer and dispersed using a paste mixer to yield a conductive fiber paste, which is then subjected to solution spinning.

12. The method of claim 11, wherein the metal-nanobelt-carbon-nanomaterial composite is contained in an amount of 1 to 50 parts by weight based on 100 parts by weight of a total amount of the conductive fiber paste including the polymer and the composite.

13. The method of claim 1, wherein the carbon nanomaterial is selected from the group consisting of carbon nanotubes (CNTs), carbon fiber, graphene, carbon black, and mixtures thereof.

14. A conductive fiber comprising a metal-nanobelt-carbon-nanomaterial composite by mixing the metal-nanobelt-carbon-nanomaterial composite comprising a carbon nanomaterial and metal nanobelts with a polymer, wherein the carbon nanomaterial is prepared by mixing and reacting a surface modified carbon nanomaterial with an isocyanate-based compound and a pyrimidine-based compound to yield a carbon nanomaterial dispersion solution reactive with a metal ion, and a metal salt precursor and a solvent are added to the carbon nanomaterial dispersion solution and a reducing agent is further added at a controlled addition rate to provide a desired reactivity rate between the metal salt precursor and the carbon nanomaterial in the carbon nanomaterial dispersion solution, thus forming the metal nanobelts on surfaces of the carbon nanomaterial and further forming the metal-nanobelt-carbon-nanomaterial composite by isolating the metal nanobelts with the carbon material from the reducing agent, the solvent and a remaining amount of the metal salt precursor.

15. The conductive fiber of claim 14, wherein the metal nanobelts have a ribbon shape so as to enable area.

16. A method of manufacturing a fibrous strain sensor, the method comprising:
subjecting a conductive carbon nanomaterial to surface modification in order to introduce the carbon nanomaterial with a functional group;
forming a carbon nanomaterial dispersion solution reactive with a metal ion by mixing and reacting the surface-modified carbon nanomaterial with an isocyanate-based compound and a pyrimidine-based compound;
forming metal nanobelts on surfaces of the carbon nanomaterial in the carbon nanomaterial dispersion solution by adding a metal salt precursor and a solvent to the carbon nanomaterial dispersion solution and by further adding a reducing agent at a controlled addition rate to provide a desired reactivity rate between the metal salt precursor and the carbon nanomaterial in the carbon nanomaterial dispersion solution;
isolating the metal nanobelts with the carbon material from the reducing agent, the solvent and a remaining amount of the metal salt precursor to form a metal-nanobelt-carbon-nanomaterial composite;
manufacturing a conductive fiber by mixing the metal-nanobelt-carbon-nanomaterial composite with a polymer; and
fabricating a fibrous strain sensor using the conductive fiber.

17. The method of claim 16, wherein the polymer is polyurethane.

18. The method of claim 16, wherein in the forming the metal nanobelts, the reducing agent is added at a rate of 0.1 to 5 ml/min based on 100 ml of a reaction solution.

19. The method of claim 16, wherein the isocyanate-based compound is selected from the group consisting of ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethyl-cyclohexane, 2,4-hexahydrotoluene diisocyanate, 2,6-hexahydrotoluene diisocyanate, hexahydro-1,3-phenylene diisocyanate, hexahydro-1,4-phenylene diisocyanate, perhydro-2,4'-diphenyl methane diisocyanate, perhydro-4,4'-diphenyl methane diisocyanate, 1,3-phenylene diisocyanate, 1,4-phenylene diisocyanate, 1,4-durol diisocyanate (DDI), 4,4'-stilbene diisocyanate, 3,3'-dimethyl-4,4'-biphenylene diisocyanate (TODI), toluene 2,4-diisocyanate, toluene 2,6-diisocyanate (TDI), diphenyl methane-2,4'-diisocyanate (MDI), 2,2'-diphenyl methane diisocyanate (MDI), diphenyl methane-4,4'-diisocyanate (MDI), naphthalene-1,5-isocyanate (NDI), 2,2-methylenediphenyl diisocyanate, 5,7-diisocyanatonaphthalene-1,4-dione, isophorone diisocyanate, m-xylene diisocyanate, 3,3-dimethoxy-4,4-biphenylene diisocyanate, 3,3-dimethoxybenzidine-4,4-diisocyanate, poly(propylene glycol) having a toluene 2,4-diisocyanate terminal group, poly(ethylene glycol) having a toluene 2,4-diisocyanate terminal group, triphenylmethane triisocyanate, diphenyl methane triisocyanate, butane-1,2,2-triisocyanate, trimethylolpropane tolylene diisocyanate trimer, 2,4,4-diphenyl ether triisocyanate, isocyanurate having a plurality of hexamethylene diisocyanates, iminooxadiazine having a plurality of hexamethylene diisocyanates, polymethylene polyphenyl isocyanate, and mixtures thereof.

20. The method of claim 16, wherein the pyrimidine-based compound is selected from the group consisting of 2-amino-6-methyl-1H-pyrido[2,3-d]pyrimidin-4-one, 2-amino-6-bromopyrido[2,3-d]pyridin-4(3H)-one, 2-amino-4-hydroxy-5-pyrimidine carboxylic acid ethyl ester, 2-amino-6-ethyl-4-hydroxypyrimidine, 2-amino-4-hydroxy-6-methyl pyrimidine, 2-amino-5,6-dimethyl-4-hydroxypyrimidine, and mixtures thereof.

21. The method of claim 16, wherein the metal salt precursor is selected from the group consisting of a gold (Au) salt precursor, a silver (Ag) salt precursor, a platinum (Pt) salt precursor, a copper (Cu) salt precursor, an aluminum (Al) salt precursor, a palladium (Pd) salt precursor, a nickel (Ni) salt precursor, and mixtures thereof.

22. The method of claim 16, wherein the reducing agent is selected from the group consisting of sodium hydroxide (NaOH), potassium hydroxide (KOH), ammonium hydroxide (NH$_4$OH), sodium borohydride (NaBH$_4$), hydrazine (N$_2$H$_4$), hydroiodide (HI), ascorbic acid, a reducible organic solvent, and mixtures thereof.

23. The method of claim 16, wherein the manufacturing the conductive fiber is performed in a manner in which the metal-nanobelt-carbon-nanomaterial composite is mixed with the polymer and dispersed using a paste mixer to yield a conductive fiber paste, which is then subjected to solution spinning.

24. The method of claim 23, wherein the metal-nanobelt-carbon-nanomaterial composite is contained in an amount of 1 to 50 parts by weight based on 100 parts by weight of a total amount of the conductive fiber paste including the polymer and the composite.

25. The method of claim 16, wherein the carbon nanomaterial is selected from the group consisting of carbon nanotubes (CNTs), carbon fiber, graphene, carbon black, and mixtures thereof.

26. A fibrous strain sensor comprising a metal-nanobelt-carbon-nanomaterial composite, the fibrous strain sensor comprising a conductive fiber formed by mixing the metal-nanobelt-carbon-nanomaterial composite comprising a carbon nanomaterial and metal nanobelts with a polymer to manufacture the conductive fiber, wherein the carbon nanomaterial is prepared by mixing and reacting a surface modified carbon nanomaterial with an isocyanate-based compound and a pyrimidine-based compound to yield a carbon nanomaterial dispersion solution reactive with a metal ion, and a metal salt precursor and a solvent are added to the carbon nanomaterial dispersion solution and a reducing agent is further added at a controlled addition rate to provide a desired reactivity rate between the metal salt precursor and the carbon nanomaterial in the carbon nanomaterial dispersion solution, thus forming the metal nanobelts on surfaces of the carbon nanomaterial and further forming the metal-nanobelt-carbon-nanomaterial composite by isolating the metal nanobelts with the carbon material from the reducing agent, the solvent and a remaining amount of the metal salt precursor.

27. The fibrous strain sensor of claim 26, wherein the polymer is polyurethane.

28. The fibrous strain sensor of claim 26, wherein the metal nanobelts have a ribbon shape so as to enable area contact.

29. The fibrous strain sensor of claim 26, wherein the conductive fiber has a resistance change of 300% or more in response to tensile strain.

* * * * *